(12) United States Patent
Kim

(10) Patent No.: US 10,470,440 B1
(45) Date of Patent: Nov. 12, 2019

(54) ANIMAL WASTE COLLECTION DEVICE

(71) Applicant: Hyung Sok Kim, Pleasanton, CA (US)

(72) Inventor: Hyung Sok Kim, Pleasanton, CA (US)

(*) Notice: Subject to any disclaimer, the term of this patent is extended or adjusted under 35 U.S.C. 154(b) by 0 days.

(21) Appl. No.: 16/403,760

(22) Filed: May 6, 2019

(51) Int. Cl.
*A01K 23/00* (2006.01)

(52) U.S. Cl.
CPC .................................. *A01K 23/005* (2013.01)

(58) Field of Classification Search
CPC .... A01K 1/0114; A01K 23/005; A01K 23/00; A01K 23/24; A01K 77/00; E01H 1/1206; E01H 1/1266; E01H 1/128; E01H 1/1286; E01H 1/1293
USPC .................................. 43/5, 7, 11–12, 85–87
See application file for complete search history.

(56) References Cited

U.S. PATENT DOCUMENTS

| | | | |
|---|---|---|---|
| 3,659,891 A | 5/1972 | Pettenon et al. | |
| 3,872,834 A | 3/1975 | Fuhrman | |
| 4,003,595 A * | 1/1977 | Fano | A01K 23/005 294/1.5 |
| 4,146,259 A | 3/1979 | Schultz | |
| D267,593 S | 1/1983 | Crawford et al. | |
| 4,705,310 A | 11/1987 | Scripter | |
| 5,050,920 A | 9/1991 | Potticary | |
| 5,131,704 A * | 7/1992 | Li | A01K 23/005 294/1.4 |
| 5,718,469 A * | 2/1998 | Ockerman | A01K 23/005 248/101 |
| 5,779,290 A * | 7/1998 | Wilke | A01K 23/005 294/1.5 |
| 6,012,416 A | 1/2000 | Lammers | |
| 6,386,606 B1 | 5/2002 | Marshall | |
| 7,287,790 B1 * | 10/2007 | Kitiashvili | E01H 1/1206 294/1.4 |
| 7,854,455 B2 * | 12/2010 | Ruscil | A01K 23/005 294/1.5 |
| 8,146,967 B1 | 4/2012 | Brown | |
| 8,308,209 B1 * | 11/2012 | Bibow | B25G 3/22 294/175 |
| 9,072,280 B1 | 7/2015 | Ramoutar | |
| 9,756,836 B2 | 9/2017 | Coba | |

(Continued)

OTHER PUBLICATIONS amazon.com, "GoGo Stik Clean Pooper Scooper. 24 to 36 inch. Small to Large Dogs. ST or XP Model Scooper. Optional EZ Wedge (Like rake). Or Scoop Set Combo. Use Store Bags Dootie Bags," [downloaded from https://www.amazon.com/GoGo-Stik-Standard-Scooper-Substitute/dp/B01DGZKJWY/ref=sr_1_2?keywords=gogostik &qid=1556908542&s=gateway&sr=8-2-spell] on May 3, 2019, 1 page.

*Primary Examiner* — Stephen A Vu
(74) *Attorney, Agent, or Firm* — Vierra Magen Marcus LLP

(57) ABSTRACT

An animal waste collection device includes an elongated shaft having a channel extending through at least a portion thereof. A handle is proximate a first end of the shaft. A loop is proximate a second end of the shaft and extends at an obtuse angle relative to the shaft so the loop can be held parallel to the ground. Clips are coupled to the loop to grasp an open-end of a disposable bag. An adjustment mechanism is maneuverable to reduce of a size of the loop by pulling a portion of the coated cable into the channel of the shaft, and maneuverable to increase the size of the loop by pushing a portion of the coated cable out of the channel of the shaft. The size of the loop controls an extent to which an open-end of a disposable bag is held open by the loop.

20 Claims, 7 Drawing Sheets

(56) References Cited

U.S. PATENT DOCUMENTS

| | | |
|---|---|---|
| 9,999,200 B1 | 6/2018 | Desimone |
| 2003/0085581 A1 | 5/2003 | Jemison |
| 2009/0302626 A1* | 12/2009 | Dollar ................. B25J 9/104 |
| | | 294/106 |
| 2018/0058024 A1 | 3/2018 | Griffin |

* cited by examiner

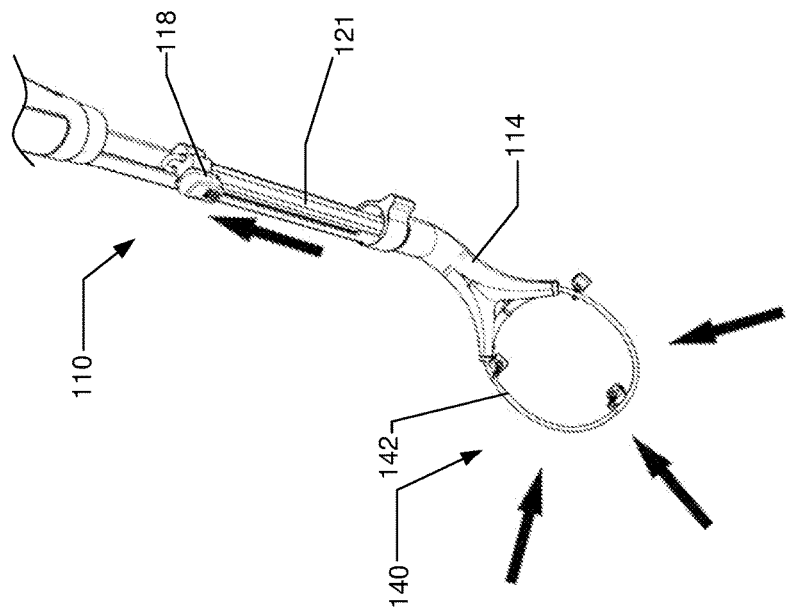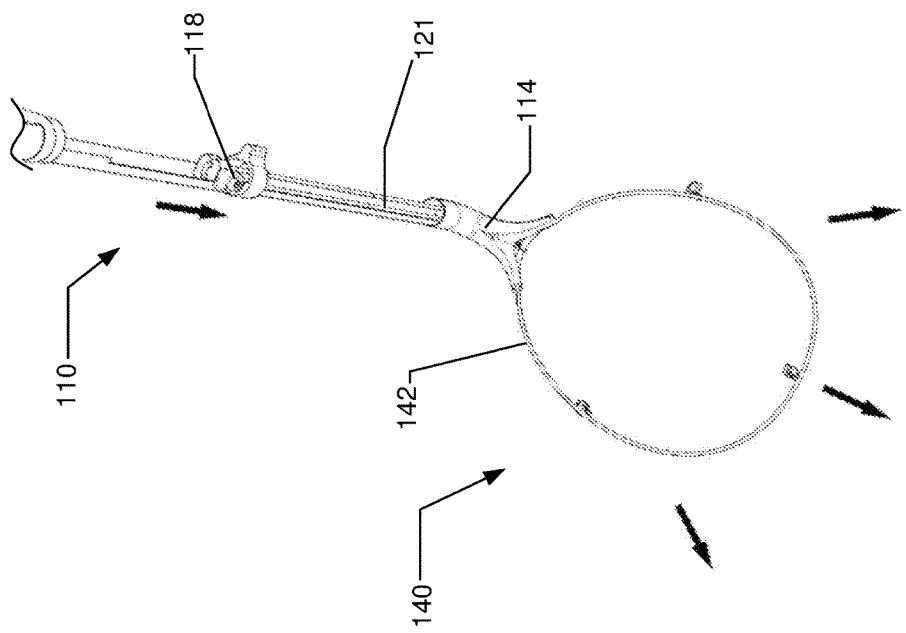

ANIMAL WASTE COLLECTION DEVICE

FIELD

This disclosure generally relates to animal waste collection devices, and more particularly to devices that can be used to collect animal excrement within a disposable bag.

BACKGROUND

Waste (i.e., excrement) left by domestic animals and pets, such as dogs, is unsightly, and if not collected and disposed of appropriately can present a health hazard. Accordingly, many ordinances require pet owners to collect and properly dispose of their pets' excrement, which can also be referred to as feces, refuse, or waste. Various types of devices have been developed in an attempt to provide an efficient and convenient implement for this purpose which permits the pet owner to collect the refuse without directly contacting the refuse and which facilitates sanitary disposal of the refuse. However, such devices still have deficiencies, some of which are discussed below.

SUMMARY

Embodiments of the present technology described herein are related to animal waste collection devices. In accordance with certain embodiments, an animal waste collection device includes an elongated shaft, a handle, a loop-support structure, a loop, a plurality of clips, and an adjustment mechanism. The elongated shaft has a first end, a second end opposite the first end, and a channel that extends through at least a portion of the elongated shaft between the first and second ends thereof. The handle is proximate the first end of the elongated shaft. The loop-support is proximate the second end of the elongated shaft. The loop (that is supported by and extends from the loop-support) comprises a portion of a coated cable that extends out from the channel of the elongated shaft, wherein a further portion of the coated cable extends within the channel of the elongated shaft. The plurality of clips are coupled to the loop and configured to grasp points along a circumference of an open-end of a disposable bag so that the disposable bag can be clipped on the loop and held open by the loop. The adjustment mechanism configured to be maneuvered in a first manner to reduce a size of the loop, which is supported by and extends from the loop-support, by pulling a portion of the coated cable into the channel of the shaft. Additionally, the adjustment mechanism is configured to be maneuvered in a second manner to increase the size of the loop, which is supported by and extends from the loop-support, by pushing a portion of the coated cable out of the channel of the shaft. The size of the loop, which is adjustable by maneuvering the adjustment mechanism, controls an extent to which an open-end of a disposable bag is held open by the loop.

In accordance with certain embodiments, the adjustment mechanism comprises a slide mechanism configured to be slid to-and-fro along a length of the elongated shaft. In such embodiments, the size of the loop is reduced in response to the sliding mechanism being slid in a first direction that causes a portion of the coated cable to be pulled into the channel of the shaft. Conversely, the size of the loop is increased in response to the sliding mechanism being slid in a second direction that causes a portion of the coated cable to be pushed out of the channel of the shaft, the second direction being opposite the first direction.

In accordance with certain embodiments, the loop-support is configured to support the loop at an obtuse angle relative to the elongated shaft so that when the elongated shaft is held at an acute angle relative to a ground the loop can be held parallel to the ground.

In accordance with certain embodiments, the loop-support includes first and second orifices through which portions of the coated cable extend. At least a portion of the coated cable can be pulled into the channel of the elongated shaft through at least one of the first and second orifices, and at least a portion of the coated cable can be pushed out of the channel of the elongated shaft through at least one of the first and second orifices.

In accordance with certain embodiments, the coated cable comprises a braided or stranded wire that is coated with a thermoplastic coating or a thermoset coating. The thermoplastic or thermoset coating increases a rigidity of the loop compared to if the loop comprised an uncoated braided or stranded wire. The thermoplastic or thermoset coating also protects the braided wire or stranded wire from splitting and potentially injuring a user.

In accordance with certain embodiments, the loop-support comprises a shaft attachment portion above an elbow and a Y-shaped portion below an elbow. The Y-shaped portion including a first branch and a second branch, with each of the first and second branches including a respective orifice through which portions of the coated cable pass. Portions of the coated cable are pushed into or out of the channel of the shaft through at least one of the orifices of the first and second branches of the Y-shaped portion of the loop-support. In specific embodiments, portions of the coated cable are pushed into or out of the channel of the shaft through the orifices of both the first and second branches of the Y-shaped portion of the loop-support. In certain embodiments, the loop-support includes a span that extends between the first and second branches of the Y-shaped portion of the loop-support.

In accordance with certain embodiments, a wheel extends from and is attached to a lower portion of the loop-support to make it easier to slide the loop 140 under the rectum of a dog. In certain embodiments, the device includes a light that is configured to illuminate the loop, to assist with use of the device in the dark or a dimly lit environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 3A and 3B illustrate how a loop of the animal waste collection device, which loop is used to hold open a disposable bag, can be increased or reduced in size by manually sliding a button along a length of the shaft of the animal waste collection device.

DETAILED DESCRIPTION

Figure 1:
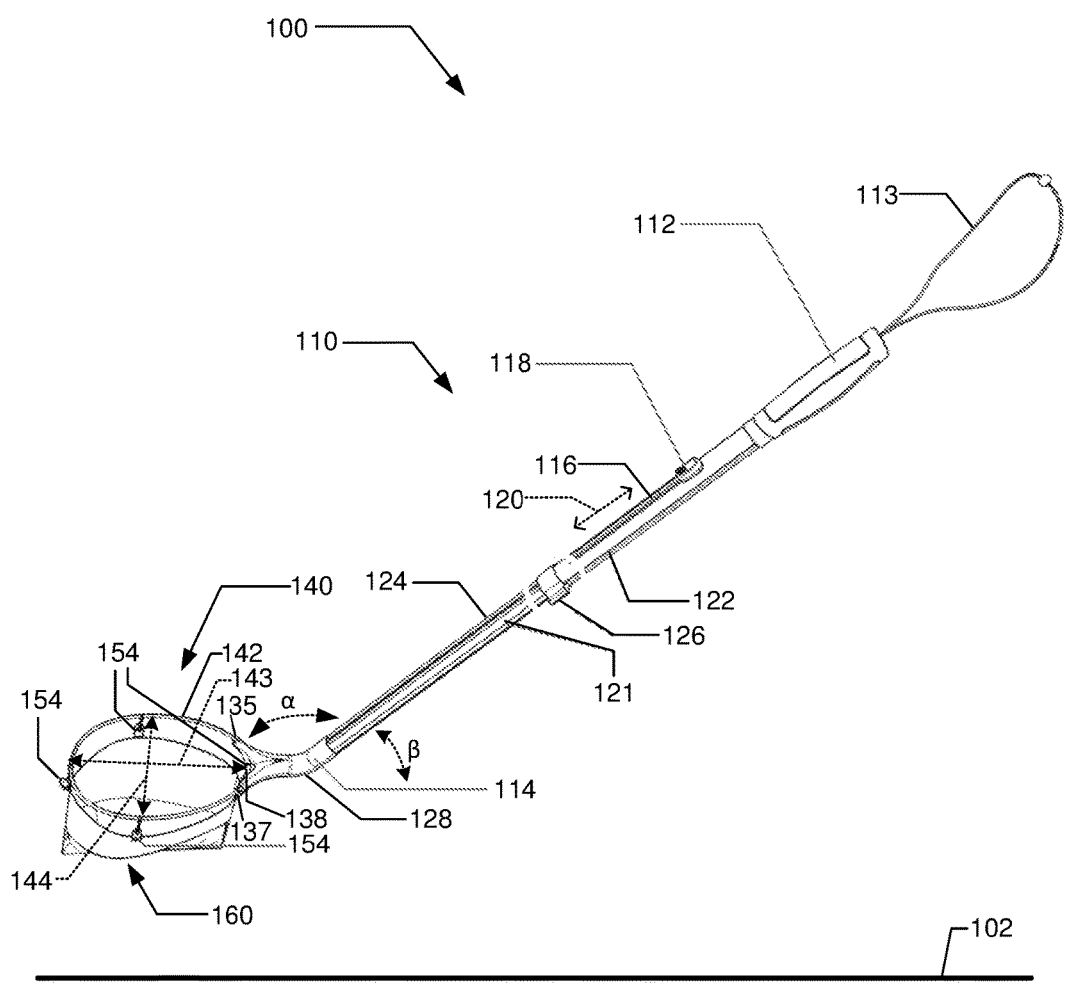
FIG. 1 illustrates an animal waste collection device according to an embodiment of the present technology.

The most common way that people pick up animal waste is by placing one of their hands within a disposable bag so that the bag acts like a mitten or glove. The person then bends over and picks up the waste from the ground using their fingers, and then turns the bag inside out and ties it closed. For small animals this technique is doable, but for larger animals this technique can be horrific. Even for small animals, this common technique can be difficult for elderly people and other people that have difficulty bending over and standing back up.

There are a few types of devices on the market that can be used to assist with picking up animal waste. Some devices function like an excavator to help pick up waste from the ground by opening and closing jaws or shovels of the device. Other devices include a rake and tray, wherein the rake is used to push animal waste into a tray. A problem with such devices is that once waste is placed within the jaws or tray, the waste still needs to be disposed of within a garbage bag or the like, and such devices need to be constantly cleaned since excrement will stick to the jaws or tray.

At least some marketed or proposed animal waste collection devices may be used to catch an animal's (e.g., a dog's) excrement before the excrement lands on the ground. When a person using such a device recognizes that a dog is about to defecate, the person can attempt to maneuver a shaft of the device to position a held open disposable bag below the dog's anus, such that when the dog defecates the dog's excrement will be caught in the held open bag. Thereafter, the bag that contains the excrement is typically removed from the device, and bag is manually tied closed by a person and disposed of in a garbage can or another type of waste receptacle. In order to tie such a bag closed, a person typically needs to hold in their hands a portion of the bag that is proximate to the opening of the bag. If there is excrement smeared or otherwise located along a portion of the bag that is proximate to the opening of the bag, the person that ties the bag closed may unfortunately and undesirably get excrement on their hands.

Some animal waste collection devices on the market enable their elongated shaft to be adjusted in length to accommodate different heights of different users (i.e., people). However, to the knowledge of the inventor, portions of such devices that hold open disposable bags are fixed in size. This leads to certain deficiencies of such devices, as described below.

Dogs vary in size more than most other mammals. For example, very large dogs, such as Great Danes and Mastiffs, often weigh well over 50 kilograms (i.e., well over 100 pounds) and are often well over 60 centimeters (i.e., well over 2 feet) in height. On the other end of the spectrum, small dogs, such as Chihuahuas and Papillons, as well as numerous "toy" breeds, often weigh well less than 5 kilograms (i.e., well less than 10 pounds) and are often well under 30 centimeters (i.e., well under 1 foot) in height. Despite this large variation in the size of dogs, to the knowledge of the inventor, the portions of existing animal waste collection device that hold open a disposable bag are fixed in size, as noted above. In other words, relative to the dogs that such existing devices can be used with, these devices have been designed and manufactured under the assumption that "one size fits all" dogs. However, this assumption does not ring true, and can lead to the use of such existing devices being difficult and potentially messy and unsanitary, as described below.

Where a waste collection device holds open a disposable bag that is used to catch a dog's excrement before the excrement lands on the ground, it is preferred that a center of a held open bag is aligned with a dog's rectum, in order to minimize the amount of excrement that comes in contact with portions of the bag close to the bag's opening. This is to minimize the probability that a person undesirably gets excrement on their hands when the person manually ties the bag closed. More specifically, if excrement that drops from a dog's anus comes in contact with a bag proximate to the bag's opening, it is likely that a portion of the excrement will get smeared along a portion of the bag that is close to the bag's opening. In such a case, when a person manually ties the bag closed, there is high probability that the person will get excrement on their hands, which is both messy and unsanitary.

Assume, for example, that an animal waste collection device is designed to hold open a disposable bag such that a fixed diameter of the held open bag is ten inches. When using such a device it may be relatively easy align the center of a held open bag with a medium or large dog's rectum. However, it may be difficult or impossible to use such a device to align the center of a held open bag with a small dog's rectum. For another example, assume that instead an animal waste collection device is designed to hold open a disposable bag such that a fixed diameter of the held open bag is only four inches. When using such a device it may be relatively easy align the center of a held open bag with a small dog's rectum. However, it may be difficult or impossible to use such a device to align the center of a held open bag with a large dog's rectum.

Certain embodiments of the present technology overcome the aforementioned deficiencies of prior animal waste collection devices. More specifically, an animal waste collection device according to an embodiment of the present technology is configured to allow an opening size (e.g., a diameter) of a held open bag to be adjusted so that the opening size is of an appropriate size for the size of the dog with which the waste collective device is being used. Accordingly, when the device is to be used with a large dog the device can be adjusted such that an opening size of a held open bag is relatively large, and when the device is to be used with a small dog the device can be adjusted such that an opening size of a held open bag is relatively small. Accordingly, the same waste collection device can be used by different people that are responsible for different sized dogs, as well as by a same person that is responsible for multiple different sized dogs.

FIG. 1 illustrates an animal waste collection device 100 according to an embodiment of the present technology. The animal waste collection device 100 can also be referred to more succinctly as the waste collection device 100, or even more succinctly as the device 100. The waste collection device 100 is especially useful for collecting waste (i.e., excrement or feces) from dogs. Beneficially, as will be described in additionally detail below, the waste collection device 100 can be adjusted for use with dogs of various different sizes. While in the discussion herein the animal waste collection device 100 is primarily discussed as being used to collect the excrement of dogs, the device 100 can alternatively or additionally be used with other types of animals, such as, but not limited to, cats, goats, sheep, horses, mules, donkeys, etc. Accordingly, the device 100 is not limited to use with dogs.

Referring to FIG. 1, the waste collecting device 100 is shown as including an elongated shaft 110 that has a handle 112 at one end and a loop-support 114 at the other end. The end of the shaft 110 at which the handle 112 is located can also be referred to as the proximal end, since that is the end that will be closest (i.e., most proximal) to the person holding and using the device 100. While the handle 112 in FIG. 1 is shown as being ergonomic and fit or molded over a portion of the proximal end of the shaft 110, the handle 112 can instead simply be a proximal portion of the shaft 110. The end of the shaft 110 at which is located the loop-support 114 can also be referred to as the distal end, since that is the end that is furthest (i.e., most distal) from the person holding and using the device 100. In certain embodiments, the handle 112 has an ergonomic shape that is molded from plastic and/or rubber and is press fit over a proximal end of a separately manufacture elongated shaft. Alternatively, the handle 112 can be integrally formed with a proximal end of the elongated shaft 110, and thus, can be a proximal portion of the elongated shaft 110. A wristlet 113 is shown as be attached to and extending from the handle 113. The wristlet 113 can be placed around a user's wrist when the device 100 is being used, and can also be used to hang the device 100 on a hook or the like when the device 100 is not being used.

In accordance with an embodiment, the elongated shaft 110 is a telescopic shaft that includes a first shaft segment 122 (which can also be referred to as a proximal segment 122), a second shaft segment 124 (which can also be referred to as a distal segment 124), and a locking ring 126. The locking ring 126 can be released to enable the first and second shaft segments 122 and 124 to be moved relative to one another, by sliding a portion of one of the segments within the other, to thereby adjust the length of the elongated shaft 110. When the length of the elongate shaft 110 is at an appropriate or desired length for the particular person using the device 100, the locking ring 126 can be locked to thereby maintain the elongated shaft 110 at that length. Other types of locking mechanisms can be used in place of the locking ring 126. As will be described in additional detail below, e.g., with reference to FIG. 2, the shaft 110 includes a channel 121 extending through its longitudinal length. The segments 122 and 124 can be molded or extruded from a plastic, resin, metal, and/or alloy.

Figure 2:
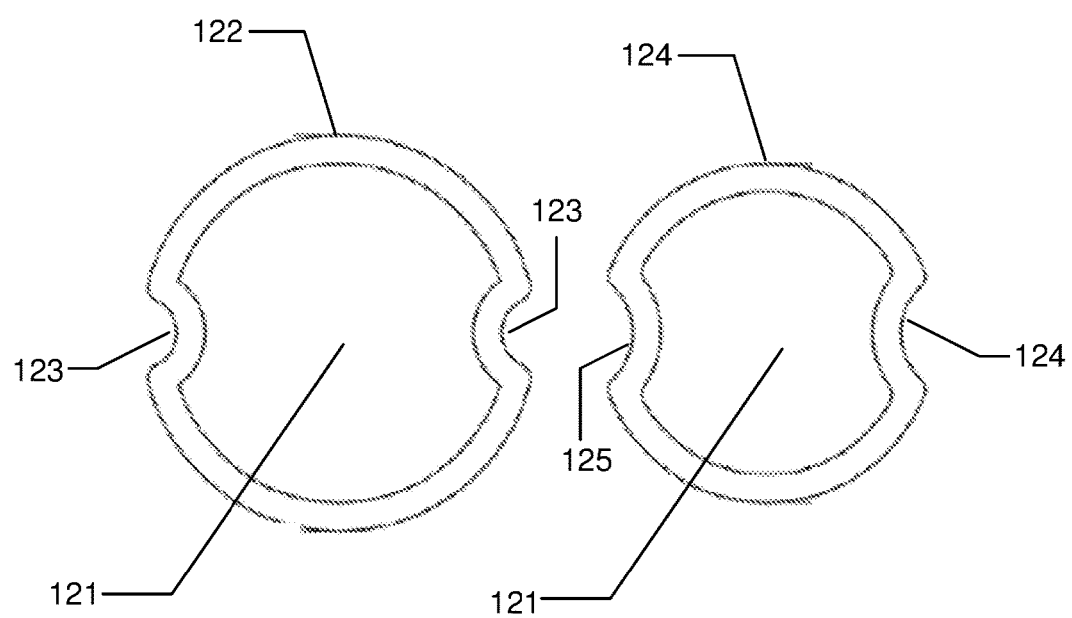
FIG. 2 illustrates profiles (i.e., cross-sections) of first and second segments of a shaft of the animal waste collection device introduced in FIG. 1.

In the embodiment shown in FIG. 1, the second segment 124 of the shaft 110 has a smaller diameter than the first segment 122 of the shaft, such that portion of second segment 124 can be slid into the first segment 122 to reduce the length of the shaft 110. Referring briefly to FIG. 2, a profile (i.e., cross-section) of the first segment 122 is shown at the left, and a profile (i.e., cross-section) of the second segment 124 is shown at the right. As shown in FIG. 2, each of the segments 122 and 124 is tubular such that it is hollow throughout its length. The profile of each of the tubular segments 122 and 124 has respective grooves 123 and 125 to guide the tubular segments 122 and 124 relative to one another and prevent rotation of the tubular segments 122 and 124 relative to one another. The grooves 123 and 125 also increase the strength of the tubular segments 122 and 124.

Each of the tubular segments 122 and 124 has a channel 121 that extends the length of the segment. When the segments 122 and 124 are inserted one within the other, the channels 121 of the segments 122 and 124 provide a single channel 121 whose length can be adjusted by linearly moving the segments 122 and 124 relative to one another. The channel that extends through both segments 122 and 124 of the shaft 110 can be referred herein as the channel 121 of the shaft 110. In another embodiment, the elongated shaft 110 includes more the two segments, e.g., includes three, four, or more segments. In still another embodiment, the elongated shaft 110 includes only a single segment and is fixed in length.

Referring again to FIG. 1, the loop-support 114 is shown as supporting a loop 140 that holds open a disposable bag 160 that can be selectively attached to and detached from the loop 140. In the embodiment of FIG. 1, the loop-support 114 includes an elbow portion 128 that bends at an obtuse angle α, which enables the loop 140 to be held substantially parallel to the ground 102 when the elongated shaft 110 is held at an acute angle β relative to the ground 102. Additionally details of the loop-support 114, according to certain embodiments, are described below with reference to FIG. 4A.

In accordance with certain embodiments, the loop 140 is made of a length of coated braided wire 142, which includes strands of wire that are braided together and then coated with a thermoplastic, such as polyvinyl chloride (PVC). In alternative embodiments, the loop 140 is made of a length of coated stranded wire rather than coated braided wire. Instead of the braided or stranded wire of the loop 140 having a PVC coating, another type of thermoplastic coating can be used, such as Polyethylene (PE), ethylene chlorotrifluoroethylene (ECTFE), polyvinylidene difluoride (PVDF), or nylon. The coating of the loop 140 can alternatively be a thermoset coating, such as cross-linked polyethylene (XLPE), or chlorinated polyethylene (CPE), or ethylene propylene rubber (EPR). The coating material that surrounds the underlying braided or stranded wire adds rigidity to the loop 140, to thereby prevent the loop 140 from sagging. Additionally, the coating material can also prevent fraying of underlying wires, protect underlying wires, and make the loop 140 easier to clean. Further, any color can be selected for the coating, and thus, for the loop 140. In accordance with an embodiment, the diameter of the coated braided or stranded wire 142 that is used to form the loop 140 is about 3 millimeters (mm), however coated braided or stranded wire of smaller or larger diameters can alternatively be used. The coated braided or stranded wire 142 can also be referred to herein as a coated cable 142 or as a coated wire rope 142.

In accordance with certain embodiments, a plurality of clips 154 are coupled to the loop 140 to enable the disposable bag 160 to be clipped to the loop 140 at various different points about a periphery of an open-end of the bag 160. The clips 154 can be generally spaced about a periphery of the loop 140 such that clips are generally equally spaced apart from one another, but that need not be the case. In the embodiment shown, there are four clips 154, three of which are coupled to the coated cable 142 and one of which is coupled to the loop-support 114. However, it is also within the scope of the embodiments described herein for a device to include more that four clips, or less than four clips. The clips 154 can be directly connected to the loop 140, or the clips 154 can alternatively hang from cords that are directly connected to the loop 140. Other variations are also possible and within the scope of the embodiments described herein. The clips 154 frictionally grasp portions of a periphery of the open-end of the bag 160. In order to remove the bag 160 from the device 100, a person can squeeze or otherwise release each of the clips 154 to release the bag 160 from the loop 140. Alternatively, a person can simply pull down on the bag 160 to overcome the frictional force with which the clips 154 hold onto to the bag 160. In alternative embodiments, other types of fasteners besides clips can connected to the loop 140 and used to attach a disposable bag (e.g., 160) to the loop 140 and hold the bag open.

Still referring to FIG. 1, the elongated shaft 110 as shown as including an elongated aperture 116 that extends along a portion of a length of the shaft 110. The aperture 116 allows a manually operable button 118 to be moved to-and-fro towards the proximal end of the shaft 110 or towards to distal end of the shaft 110, as indicated by double sided arrow 120. In accordance with an embodiment of the present technology, the size (e.g., diameter) of the loop 140 is adjustable by moving the manually operable button 118 to-and-fro using a thumb or other digit. In accordance with an embodiment, the size of the loop can be maximized by sliding the button 118 as far as it can go towards the distal end of the shaft 110 (i.e., towards the loop-support 114), and the size of the loop can be minimized by sliding the button 118 as far is it can go towards the proximal end of the shaft 110 (i.e., towards the handle 112). Various different sizes for the loop 140 can be selected by sliding the button 118 to midpoints along the length of the aperture 116.

The loop 140 is shown as being an ellipse that has a major axis 143 and a minor axis 144. In other words, the loop 140 has an elliptical shape. While it is possible that the elliptical loop 140 can form a circle (where the major axis 143 and the minor axis 144 of an ellipse are equal), it is more likely that the elliptical loop 140 forms an oval or some other type of non-circular type of ellipse. The area (A) of the opening formed by the elliptical loop 140, which can also be referred to herein as the size of the loop, can be approximated by the equation: $A=\pi*A*B$, wherein A is the length of the semi-major axis (i.e., half the length of the major axis 143), and B is the length of the semi-minor axis (i.e., half the length of the minor axis 144). In accordance with certain embodiments, the size of the loop 140 can be adjusted such that the length of the major axis 143 can be varied between about 15 cm and 30 cm, and the length of the minor axis 144 can be varied between about 10 cm and 20 cm, and thus, the size of the loop 140 (i.e., the area of the opening of the loop 140) can be varied to between about 120 cm^2 and 480 cm^2 (wherein the term "about", as used herein, means plus and minus ten percent of the referenced value). In this manner, the size of the loop can be adjusted to appropriately accommodate use with very small dogs (e.g., Chihuahuas and Papillons), use with very large dogs (e.g., Great Danes and Mastiffs), as well as use with medium size dogs (e.g., Border Collies and Dalmatians). FIG. 3A shows how the size of the loop 140 can be maximized by sliding the button 118 as far is it can go towards the distal end of the shaft 110, and FIG. 3B shows how the size of the loop 140 can be minimized by sliding the button 118 as far as it can go towards the proximal end of the shaft 110. Various different sizes of the loop 140, between its maximum and minimum sizes, can be achieved by sliding the button 118 to various positions along the length of the aperture 116. The button 118 is an example of a slide mechanism. Alternative types of slide mechanisms can be used in place of the button 118, such as, but not limited to, a slide stick or slide handle. In FIGS. 3A and 3B, portions of the shaft 110 are cut-away to show that portions of the coated cable 142 can be pulled into and pushed out of the channel 121 within the shaft 110.

A disposable bag (e.g., 160) with which the animal waste collection device 100 is used will have a closed-end and an open-end, wherein the open-end of such a bag can also be referred to as the opening of the bag. As explained above, using the animal waste collective device 100 excrement is caught in such a bag when the excrement drops from a dog's anus and enters the bag through the bag's open-end. While an open-end (aka opening) of a bag will have a maximum extent to which it can be held open, which is specified by how the bag is designed and manufactured, the open-end of a bag can be held open at less than the maximum extent. For example, while a bag may be designed and manufactured such that when its open-end is held fully open the area of its open-end is 500 cm^2, it is also possible to cinch or otherwise constrain the open-end of the bag such that its held open area is much less than is maximum, e.g., is only 100 cm^2 or 200 cm^2. While changing the size of the loop 140 does not change the maximum extent to which an open-end of a bag attached to the loop 140 can be held open, it does change the extent to which the open-end of the bag attached to the loop 140 is actually held open.

Figure 4A:
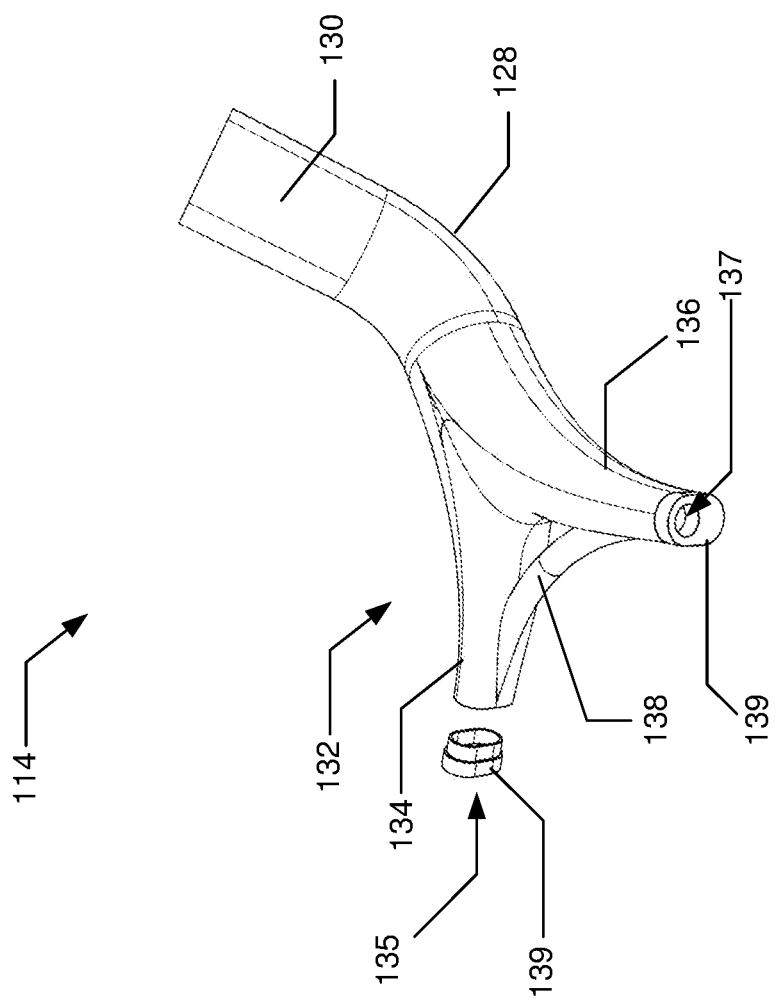
FIG. 4A illustrates details, according to an embodiment, of the loop-support of the animal waste collection device introduced in FIG. 1.
Figure 4B:
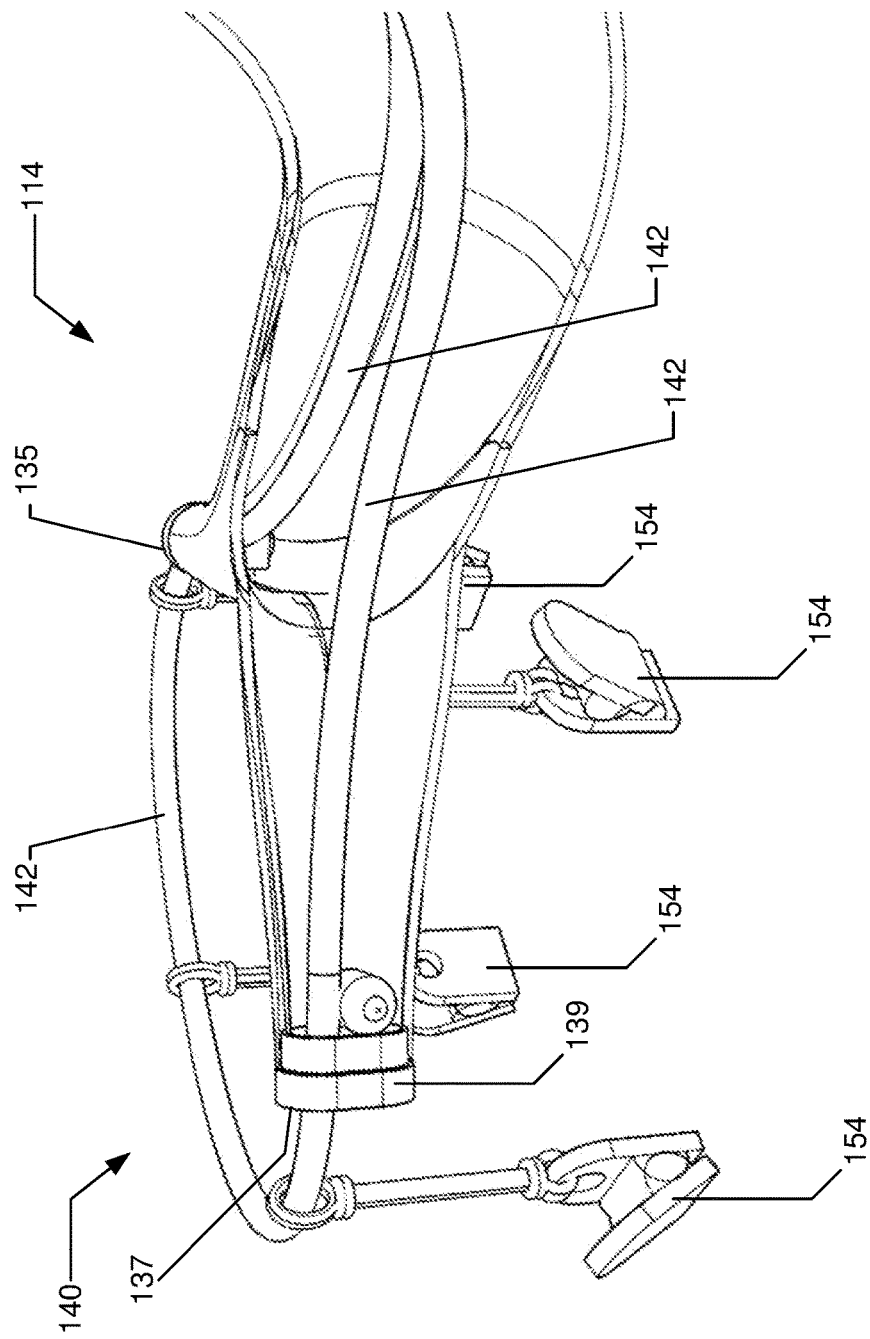
FIG. 4B illustrates a partially cut-out view of the loop-support supporting a loop formed of a coated cable.

Referring to FIG. 4A, the loop-support 114 is shown as including a shaft attachment portion 130 above the elbow 128, and a Y-shaped portion 132 below the elbow 128. The shaft attachment portion 130 attaches the loop-support 114 to the distal end of the shaft 110. The Y-shaped portion 132 includes a first branch 134 having a first orifice 135 and a second branch 136 having a second orifice 137. Respective caps 139 can be press fit into each of the orifices 135 and 137 to modify the shapes of the orifices 135 and 137, e.g., to make the orifices 135 and 137 circular, and reduce the size of the orifices 135 and 137 so they are just slightly larger than the circumference of the coated cable 142 that provides the loop 140. For example, if the diameter of the coated cable 142 is 3 mm, then the diameter of the orifices 135 and 137 (provided by the caps 139) can be 3.1 mm. This is just an example, which is not meant to be limiting. The loop-support 114 is also shown as including span 138 that extends between the first and second branches 136 and 137. The span 138 can be used to increase the strength of the loop-support 114, and more specifically, the strength of the Y-shaped portion 132. Additionally, the span 138 can have a clip 154 directly connected to the span 138, or a clip 154 can alternatively hang from a cord that is directly connected to the span 138. Accordingly, the span 138 can be used to assist in holding open an open-end of a disposable bag. In certain embodiments, the loop-support 114 is molded from a plastic, resin, metal, and/or alloy and is press fit over (or into) a distal end of a separately manufacture elongated shaft 110. Alternatively, the loop-support 114 can be integrally formed with a distal end of the elongated shaft 110. FIG. 4B illustrates that loop-support 114, with a portion thereof cut-out to show how portions of the coated cable 142 can extend into the loop-support 114 through the offices 135 and 137 included with the branches 134 and 136 of the Y-shaped portion 132 of the loop-support 114.

Figure 4C:
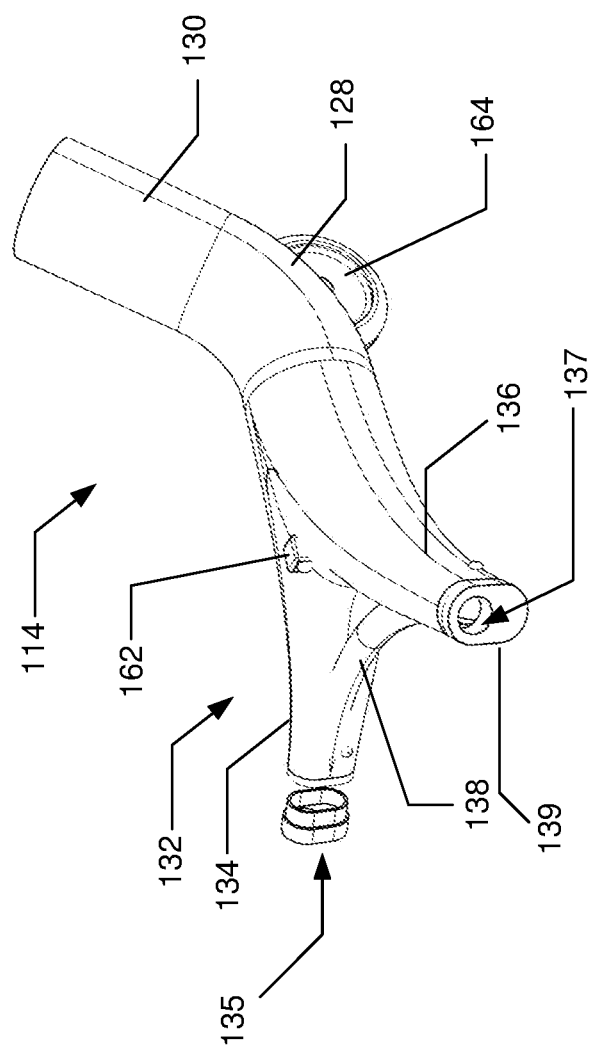
FIG. 4C illustrates details an alternative embodiment for the loop-support for the animal waste collection device.

FIG. 4C illustrates details of an alternative embodiment for the loop-support 114 for the animal waste collection device 100. Referring to FIG. 4C, the loop-support 114 shown therein has all the components of the loop-support 114 described above with reference to FIGS. 4A and 4B, but also includes a light 162 and a wheel 164. The light 162 aids with use of the animal waste collection device 100 in the dark or in a dimly lit area. The light 162, which can be configured to illuminate the loop, can include one or more light emitting elements, each of which can be a light emitting diode (LED), or an incandescent lamp, but is not limited thereto. The light 162 can be selectively turned on and off by a user using a switch or button (not shown), which can be located on the loop-support 114 (e.g., adjacent to light 162), or can be located on the shaft 110 or the handle 112. A rechargeable and/or replaceable battery (not shown) for the light 162 can be located in a same housing that holds the light 162, in or adjacent a portion of the shaft 110, or in or adjacent to a portion of the handle 112, but is not limited thereto. Alternative and/or additional locations for the light 162 are within the scope of the embodiments described herein.

The wheel 164 aids with maneuvering the loop-support 114 (and the loop 140 supported by the loop-support 114) at a distance above the ground, and makes it easier for a user to slide the loop 140 under the rectum of a dog, especially when the dog is defecating on a hard surface, such as a road, a sidewalk, a path, or the like. While only one wheel 164 is shown in FIG. 4C, more than one wheel can be included. It is also noted that the size of the wheel can be smaller or larger than shown in FIG. 4C. The wheel 164 can rotate about a shaft that is attached to the loop-support 114, e.g., by one or more arm, at a location on or close to the elbow portion 128, but is not limited thereto. In certain embodiments, the wheel(s) 164 can be retractable and/or removable.

Figure 5:
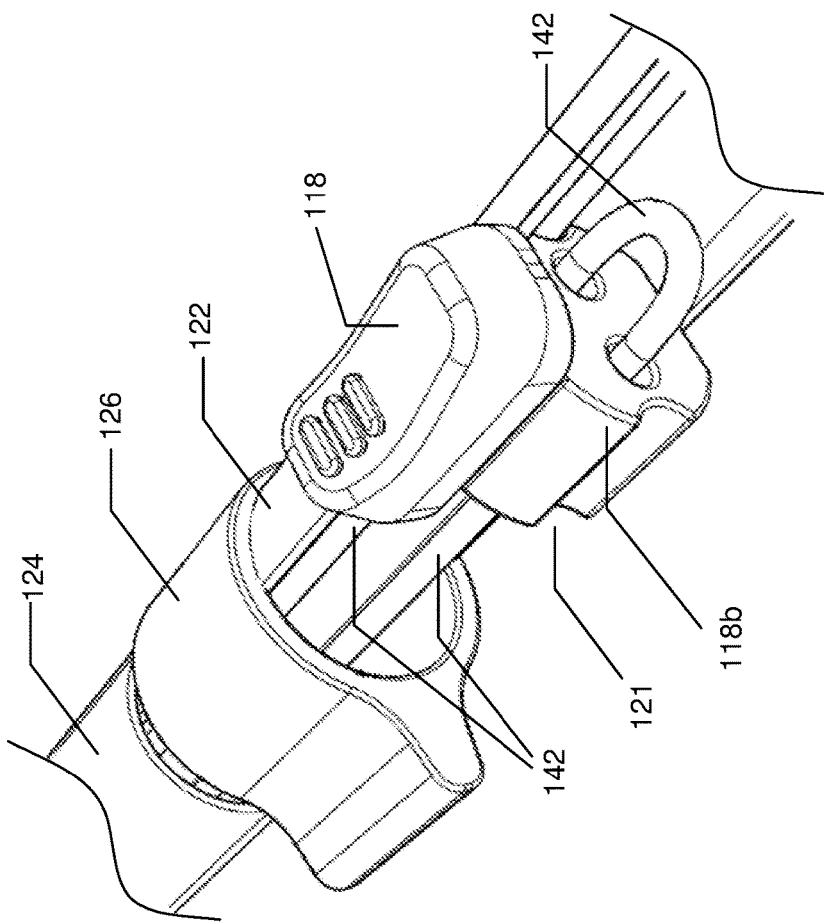
FIG. 5 illustrates how lengths of a coated cable that is used to provide the loop of the animal waste collection device (which loop is used to hold open a disposable bag) extend within a channel of the shaft and are coupled to a slidable button.

In accordance with certain embodiments, a length of the coated cable 142 extends through the orifice 135 and through the channel 121 of the shaft 110 all the way to the button 118, and a further length of the coated cable 142 extends through the orifice 137 and through the channel 121 of the shaft 110 all the way to the button 118. This can be seen, for example, in FIGS. 2A and 2B. Ends of the aforementioned lengths of the coated cable can be secured to the button 118. Alternatively, the coated cable 142 can be connected into a large loop such that a portion of the large loop extends from and is supported by the loop-support 114 to provide the loop 140 that is used to hold open an open-end of a disposable bag (e.g., 160), and a remainder of the large loops extends through the channel 121 and is coupled to the button 118, e.g., as can be seen in FIG. 5. As can also be seen in FIG. 5, the button 118 includes an internal portion (labeled 118b) that slides within the channel 121 of the shaft as a person uses one of their digits (e.g., their thumb) to slide the exposed portion of the button 118 to-and-fro. In FIG. 5 portions of the shaft 110 are cut-away to show that portions of the coated cable 142 extend through at least a portion of the channel 121 within the shaft 110.

The slidable button 118 is an example of an adjustment mechanism that is configured to selectively control the size of the loop 140, and more specifically, that is configured to be maneuvered in a first manner to reduce of a size of the loop 140 by pulling a portion of the coated cable 142 into the channel 121 of the shaft 110, and maneuvered in a second manner to increase the size of the loop 140 by pushing a portion of the coated cable 142 out of the channel 121 of the shaft 110. As noted above, the slidable button 118 can be replaced with some other slide mechanism. In alternative embodiments, other types of adjustment mechanisms can be used in place of a slice mechanism. For example, a rotating mechanism can be rotating in a first direction (e.g., clockwise) to wind a portion of the coated cable 142 about a spool to reduce of a size of the loop 140 by pulling a portion of the coated cable 142 into the channel 121 of the shaft 110, and can be rotated in a second direction (e.g., counter clockwise) to increase the size of the loop 140 to unwind a portion of the coated cable 142 from the spool to increase the size of the loop 140 by pushing a portion of the coated cable 142 out of the channel 121 of the shaft 110. Other variations are also possible and within the scope of the embodiments described herein. The adjustment mechanism that is configured to selectively control the size of the loop 140 can be manually adjustable, as was the case in the above described embodiments. Alternatively, a battery operated servo motor or some other type of motor can be included in the animal waste collection device and can be activated in one of two different manners to electromechanically increase and decrease the size of the loop 140.

The slidable button 118 and the elongated aperture 116 were shown as being adjacent to and/or part of the segment 122 of the shaft 110. The slidable button 118 and the elongated aperture 116 can instead be adjacent to and/or part of the segment 124 of the shaft 110. More generally, the adjustment mechanism that is used to adjust the size of the loop 140 can be moved to different locations along the shaft 110 and may even be adjacent to and/or part of the handle 112, depending upon the specific implementation.

In the embodiments described above, portions of the coated cable 142 are selectively pulled into and out of the channel 121 of the shaft 110 through both orifices 135 and 137 of the loop-support 114. In alternative embodiments, one end of the coated cable 142 can be fixedly attached within the loop-support 114 or the channel 121 of the shaft 110, and another end of the coated cable 142 can be pulled into and out of the channel 121 of the shaft 110 through just one of the orifices 135 or 137.

As noted above, while in the discussion herein the animal waste collection device 100 was primarily discussed as being used to collect the excrement of dogs, the device 100 can alternatively or additionally be used with other types of animals, such as, but not limited to, cats, goats, sheep, horses, mules, donkeys, etc. Accordingly, the device 100 is not limited to use with dogs.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An animal waste collection device for use with a disposable bad having an open-end and a closed-end and that is selectively attachable to and removable from the animal waste collection device, the animal waste collection device comprising:
    an elongated shaft having a first end, a second end opposite the first end, and a channel that extends through at least a portion of the elongated shaft between the first and second ends thereof;
    a handle proximate the first end of the elongated shaft;
    a loop-support proximate the second end of the elongated shaft;
    a loop that is supported by and extends from the loop-support, the loop comprising a portion of a coated cable that extends out from the channel of the elongated shaft, wherein a further portion of the coated cable extends within the channel of the elongated shaft;
    a plurality of clips coupled to the loop and configured to grasp points along a circumference of the open-end of the disposable bag so that the disposable bag is held open by the loop; and
    an adjustment mechanism configured to be
        maneuvered in a first manner to reduce of a size of the loop, which is supported by and extends from the loop-support, by pulling a portion of the coated cable into the channel of the elongated shaft, and
        maneuvered in a second manner to increase the size of the loop, which is supported by and extends from the loop-support, by pushing a portion of the coated cable out of the channel of the elongated shaft;
    wherein the size of the loop, which is adjustable by maneuvering the adjustment mechanism, controls an extent to which the open-end of the disposable bag is held open by the loop, such that the extent to which the open-end of the disposable bag is held open by the loop is reduced in response to the adjustment mechanism being maneuvered in the first manner that reduces the size of the loop, and such that the extent to which the open-end of the disposable bag is held open by the loop is increased in response to the adjustment mechanism being maneuvered in the second manner that increases the size of the loop.

2. The animal waste collection device of claim 1, wherein:
    the adjustment mechanism comprises a slide mechanism configured to be slid to-and-fro along a length of the elongated shaft;
    the size of the loop is reduced in response to the sliding mechanism being slid in a first direction that causes a portion of the coated cable to be pulled into the channel of the shaft; and
    the size of the loop is increased in response to the sliding mechanism being slid in a second direction that causes a portion of the coated cable to be pushed out of the channel of the shaft, the second direction being opposite the first direction.

3. The animal waste collection device of claim 1, wherein:
    the loop-support is configured to support the loop at an obtuse angle relative to the elongated shaft so that when the elongated shaft is held at an acute angle relative to a ground the loop can be held parallel to the ground.

4. The animal waste collection device of claim 1, wherein:
    the loop-support includes first and second orifices through which portions of the coated cable extend; and
    at least a portion of the coated cable can be pulled into the channel of the elongated shaft through at least one of the first and second orifices; and
    at least a portion of the coated cable can be pushed out of the channel of the elongated shaft through at least one of the first and second orifices.

5. The animal waste collection device of claim 1, wherein:
    the coated cable comprises a braided or stranded wire that is coated with a thermoplastic coating or a thermoset coating; and
    the thermoplastic or thermoset coating increases a rigidity of the loop compared to if the loop comprised an uncoated braided or stranded wire.

6. The animal waste collection device of claim 1, further comprising:
    a wheel extending from and attached to a lower portion of the loop-support.

7. The animal waste collection device of claim 1, further comprising:
    a light configured to illuminate the loop.

8. An animal waste collection device, comprising:
    an elongated shaft having a first end, a second end opposite the first end, and a channel that extends through at least a portion of the elongated shaft between the first and second ends thereof;
    a handle proximate the first end of the elongated shaft;
    a loop-support proximate the second end of the elongated shaft;
    a loop that is supported by and extends from the loop-support, the loop comprising a portion of a coated cable that extends out from the channel of the elongated shaft, wherein a further portion of the coated cable extends within the channel of the elongated shaft;
    a plurality of clips coupled to the loop and configured to grasp points along a circumference of an open-end of a disposable bag so that the disposable bag is held open by the loop; and
    an adjustment mechanism configured to be
        maneuvered in a first manner to reduce of a size of the loop, which is supported by and extends from the loop-support, by pulling a portion of the coated cable into the channel of the elongated shaft, and
        maneuvered in a second manner to increase the size of the loop, which is supported by and extends from the loop-support, by pushing a portion of the coated cable out of the channel of the elongated shaft;
    wherein the size of the loop, which is adjustable by maneuvering the adjustment mechanism, controls an extent to which an open-end of a disposable bag is held open by the loop; and wherein the loop-support comprises a shaft attachment portion above an elbow and a Y-shaped portion below the elbow;

the Y-shaped portion including a first branch and a second branch; and each of the first and second branches including a respective orifice through which portions of the coated cable pass.

9. The animal waste collection device of claim 8, wherein:

portions of the coated cable are pushed into or out of the channel of the elongated shaft through at least one of the orifices of the first and second branches of the Y-shaped portion of the loop-support.

10. The animal waste collection device of claim 8, wherein:

portions of the coated cable are pushed into or out of the channel of the shaft through the orifices of both the first and second branches of the Y-shaped portion of the loop-support.

11. An animal waste collection device for use with a disposable bag having an open-end and a closed-end and that is selectively attachable to and removable from the animal waste collection device, the animal waste collection device comprising:

an elongated shaft having a handle at a first end, a support structure at a second end, and a channel that extends through at least a portion of the elongated shaft between the first and second ends thereof;

a loop of coated cable that extends from the support structure;

a plurality of fasteners coupled to the loop of coated cable and configured to fasten the open-end of the disposable bag to the loop of coated cable; and an adjustment mechanism configured to be
maneuvered in a first manner to reduce of a size of the loop of coated cable by pulling a portion of the coated cable into the channel of the elongated shaft, and
maneuvered in a second manner to increase the size of the loop of coated able, which is supported by and extends from the support structure, by pushing a portion of the coated cable out of the channel of the elongated shaft;

wherein the size of the loop of coated cable, which is adjustable by maneuvering the adjustment mechanism, controls an extent to which the open-end of the disposable bag is held open by the loop of coated cable, such that the extent to which the open-end of the disposable bad is held open by the loop is reduced in response to the adjustment mechanism being maneuvered in the first manner that reduces the size of the loop, and such that the extent to which the open-end of the disposable bag is held open by the loop is increased in response to the adjustment mechanism being maneuvered in the second manner that increases the size of the loop.

12. The animal waste collection device of claim 11, wherein:

the support structure is configured to support the loop of coated cable at an obtuse angle relative to the elongated shaft so that when the elongated shaft is held at an acute angle relative to a ground the loop of coated cable can be held parallel to the ground.

13. The animal waste collection device of claim 11, wherein:

the support structure includes first and second orifices through which portions of the coated cable pass.

14. The animal waste collection device of claim 13, wherein:

portions of the coated cable are pushed into or out of the channel of the shaft through at least one of the first and second orifices of the support structure.

15. The animal waste collection device of claim 13, wherein:

portions of the coated cable are pushed into or out of the channel of the shaft through both of the first and second orifices of the support structure.

16. The animal waste collection device of claim 11, wherein:

the coated cable comprises a braided or stranded wire that is coated with a thermoplastic coating or a thermoset coating; and the thermoplastic or thermoset coating increases a rigidity of the loop compared to if the loop comprised an uncoated braided or stranded wire.

17. An animal waste collection device, comprising:

an elongated shaft having a first end and a second end opposite the first end;

a handle proximate the first end of the elongated shaft;

a loop proximate the second end of the elongated shaft and extending at an obtuse angle relative to the elongated shaft so that when the elongated shaft is held at an acute angle relative to a ground the loop can be held parallel to the ground;

a plurality of fasteners coupled to the loop and configured to grasp points along a circumference of an open-end of a disposable bag so that the disposable bag is held open by the loop;

an adjustment mechanism configured to be maneuvered in a first manner to reduce of a size of the loop, and maneuvered in a second manner to increase the size of the loop;

a loop-support that is configured to support the loop at the obtuse angle relative to the elongated shaft so that when the elongated shaft is held at an acute angle relative to a ground the loop can be held parallel to the ground; and a wheel attached to the loop-support and configured to support the loop-support at a distance above a ground.

18. The animal waste collection device of claim 17, wherein:

the adjustment mechanism comprises a slide mechanism configured to be slid to-and-fro along a length of the elongated shaft;

the size of the loop is reduced in response to the sliding mechanism being slid in a first direction; and the size of the loop is increased in response to the sliding mechanism being slid in a second direction opposite the first direction.

19. The animal waste collection device of claim 18, wherein:

the loop comprises a coated cable.

20. The animal waste collection device of claim 17, wherein:

the loop-support comprises a shaft attachment portion above an elbow and a Y-shaped portion below the elbow;

the Y-shaped portion includes a first branch and a second branch; and each of the first and second branches includes a respective orifice through which portions of the coated cable pass.

* * * * *